Patented Oct. 6, 1942

2,298,079

UNITED STATES PATENT OFFICE 2,298,079

COATING FOR METALS EXPOSED TO CORROSION AND ABRASION

Gale L. Adams, San Marino, and Ronald A. Baker, Los Angeles, Calif., assignors to Socony Vacuum Oil Company, Incorporated, New York, N. Y., a corporation of New York No Drawing. Application March 11, 1941, Serial No. 382,780

2 Claims. (Cl. 117—29)

In certain portions of modern oil refinery equipment, as for example in channel boxes of condensers and heat interchangers, metallic surfaces are exposed to the action of corrosive vapors or gases, e. g., hydrogen sulfid and hydrochloric acid, and simultaneously to severe abrasion. The latter is caused to some extent by accidental solid particles but mainly by liquid particles, of water or condensed oil, suspended in vapor streams and impinging on the metal surfaces at high velocity.

This abrasive effect tends to remove protective coatings, either formed by initial corrosion or deliberately applied, and to renew constantly a bright metal surface for further corrosion. The protection of metals exposed to such conditions is a serious and, as yet, unsolved problem in modern refineries.

We propose as a solution of this problem a coating of which the base or bonding element is of such nature as to be strongly adherent to the metallic surface and resistant to acid or sulfur corrosion, while abrasion is resisted by a more or less superficial layer of solid grains embedded in the base.

The selection of a bonding element is governed to some extent by the temperature to which the coating will be subjected in use. For temperatures up to 400° F. we prefer a plastic resin, as for example a phenolic resin of the Bakelite type or one of the polyvinyl, copalite, or other resins insoluble in mineral oil, or one of the synthetic rubbers. These are applied to the metal surface and allowed to harden and the wear-resisting grains are then ironed into the surface with the application of heat. These coatings are strongly adherent, have enough elasticity to follow expansion and contraction of the metal, and afford a resilient support for the superficial layer of solids.

For higher temperatures, of the order of 525° to 575° Fahr. we prefer a bonding layer consisting substantially of litharge and glycerine, to which a small proportion of naphthenic or phosphoric acid may advantageously be added. The litharge and glycerine are used in equimolecular quantities or in the ratio of about 100 pounds litharge to 27.5 pounds glycerine. The yellow variety known commercially as buff litharge is preferred.

The solid matter may be dampened with glacial acetic acid and worked into the bonding layer while it is still plastic. To facilitate this operation it is often desirable to retard the setting time of the bonding layer and the additions above named have that effect, or we may add other mineral or organic acids or acid salts. A maximum of 1% by weight of almost any hydrogen-ion-forming substance may be used. The setting time may also be lengthened up to twenty-four hours or more by dessicating both the litharge and the glycerine at temperatures somewhat above the boiling point of water, as for example 106° Cent.

For the surface layer, with either bonding material, we may use clays comminuted to say 100 mesh and burned in powder form without sintering, or finely crushed flint-glass, stoneware or fire tile, or calcined diatomaceous earth in the coarser grades, or crushed hard coke, or crushed quartz, or quartz sand.

We claim as our invention:

1. The method of protecting metal surfaces exposed to corrosion by acid or sulfurous vapors, to abrasion by impinging particles, and to heat which consists in applying to said metal a coating formed of approximately 100 parts litharge and 27.5 parts glycerine and embedding grains of abrasion-resisting solids in the exposed surface of said coating.

2. A method substantially as and for the purpose set forth in claim 1, in which a hydrogen-ion-forming substance, in amount not exceeding 1%, is added to said litharge and glycerine as a retarder.

GALE L. ADAMS.
RONALD A. BAKER.